United States Patent
Eromäki (10) Patent No.: US 10,257,433 B2
(45) Date of Patent: Apr. 9, 2019

(54) MULTI-LENS IMAGING APPARATUS WITH ACTUATOR

(71) Applicant: Microsoft Technology Licensing, LLC, Redmond, WA (US)

(72) Inventor: Marko Eromäki, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/696,942

(22) Filed: Apr. 27, 2015

(65) Prior Publication Data

US 2016/0316150 A1    Oct. 27, 2016

(51) Int. Cl.
| | |
|---|---|
| *H04N 5/247* | (2006.01) |
| *G02B 27/64* | (2006.01) |
| *H04N 5/225* | (2006.01) |
| *H04N 5/232* | (2006.01) |
| *G02B 7/08* | (2006.01) |
| *G02B 13/00* | (2006.01) |
| *G02B 27/40* | (2006.01) |

(52) U.S. Cl.
CPC ............... *H04N 5/247* (2013.01); *G02B 7/08* (2013.01); *G02B 13/001* (2013.01); *G02B 27/40* (2013.01); *G02B 27/646* (2013.01); *H04N 5/2254* (2013.01); *H04N 5/23251* (2013.01)

(58) Field of Classification Search
CPC ...................................................... H04N 5/247
USPC ...................................................... 348/208.99
See application file for complete search history.

(56) References Cited

U.S. PATENT DOCUMENTS

| | | | |
|---|---|---|---|
| 4,231,645 A | 11/1980 | Davis et al. | |
| 6,172,958 B1 * | 1/2001 | Mochizuki | G11B 7/08582 369/44.17 |
| 6,816,156 B2 * | 11/2004 | Sukeno | G09G 5/10 345/204 |
| 7,480,451 B2 | 1/2009 | Ollila et al. | |
| 7,619,951 B2 * | 11/2009 | Kim | G11B 7/093 369/244.1 |
| 7,817,187 B2 * | 10/2010 | Silsby | G11B 31/006 348/208.6 |
| 8,058,571 B2 | 11/2011 | Rajagopal et al. | |

(Continued)

FOREIGN PATENT DOCUMENTS

| | | |
|---|---|---|
| EP | 2439611 A1 | 4/2012 |
| WO | 2013076350 A1 | 5/2013 |
| WO | 2014207298 A1 | 12/2014 |

OTHER PUBLICATIONS

Lai, et al., "Design of Compact Linear Electromagnetic Actuator for Auto-Focusing in Phone Camera", In Proceedings of IEEE Transactions on Magnetics, vol. 47, No. 12, Dec. 2011, 5 pages.

(Continued)

*Primary Examiner* — Cynthia Segura (57) ABSTRACT

The imaging system has two lenses coupled together, wherein both lenses face different sides of the device body. Each lens has a separate image sensor; for example, the first lens is for the front side camera and the second lens is for the back side camera. A single actuator moves both lenses simultaneously. Depending on the imaging direction, either the front side image sensor or the back side image sensor is activated and an image is received through the corresponding lens system. The actuator generates autofocus or image stabilization functions for both cameras.

20 Claims, 6 Drawing Sheets

(56) References Cited

U.S. PATENT DOCUMENTS

| | | | |
|---|---|---|---|
| 8,594,493 B2 | 11/2013 | Kwon et al. | |
| 8,648,920 B2 | 2/2014 | Terajima | |
| 8,792,782 B1* | 7/2014 | Cheng | G02B 15/04 |
| | | | 396/75 |
| 8,810,714 B2 | 8/2014 | Seol et al. | |
| 9,531,954 B2* | 12/2016 | Dong | H04N 5/23287 |
| 2004/0130978 A1* | 7/2004 | Hatazawa | G11B 7/0933 |
| | | | 369/44.22 |
| 2006/0136954 A1* | 6/2006 | Kim | G11B 7/0933 |
| | | | 720/683 |
| 2007/0268595 A1* | 11/2007 | Ho | G02B 7/102 |
| | | | 359/694 |
| 2008/0106811 A1 | 5/2008 | Eromaki | |
| 2008/0212959 A1* | 9/2008 | Shin | G02B 7/102 |
| | | | 396/508 |
| 2009/0002797 A1* | 1/2009 | Kwong | H04N 5/2259 |
| | | | 359/225.1 |
| 2009/0185463 A1* | 7/2009 | Yamazaki | G11B 7/094 |
| | | | 369/44.32 |
| 2010/0097443 A1* | 4/2010 | Lablans | G03B 37/00 |
| | | | 348/36 |
| 2010/0097444 A1* | 4/2010 | Lablans | G03B 35/00 |
| | | | 348/46 |
| 2011/0141587 A1 | 6/2011 | Schworm et al. | |
| 2011/0216641 A1* | 9/2011 | Hato | G11B 7/135 |
| | | | 369/112.23 |
| 2011/0236009 A1 | 9/2011 | Murakami et al. | |
| 2012/0039590 A1 | 2/2012 | Jacobsen et al. | |
| 2012/0075721 A1* | 3/2012 | Konishi | G02B 13/003 |
| | | | 359/708 |
| 2012/0123196 A1* | 5/2012 | Rion | A61F 5/0053 |
| | | | 600/37 |
| 2012/0148222 A1* | 6/2012 | Chou | G03B 3/10 |
| | | | 396/133 |
| 2012/0154614 A1 | 6/2012 | Moriya et al. | |
| 2013/0114194 A1 | 5/2013 | Lee et al. | |
| 2013/0120648 A1* | 5/2013 | Oh | H04N 5/2252 |
| | | | 348/374 |
| 2013/0141541 A1* | 6/2013 | Jung | G03B 35/08 |
| | | | 348/46 |
| 2013/0169857 A1 | 7/2013 | Christo et al. | |
| 2014/0009631 A1 | 1/2014 | Topliss | |
| 2014/0063331 A1 | 3/2014 | Goldenberg et al. | |
| 2014/0192459 A1 | 7/2014 | Kwong et al. | |
| 2015/0160426 A1* | 6/2015 | Chao | G02B 7/08 |
| | | | 359/824 |
| 2015/0316744 A1* | 11/2015 | Chen | H04N 5/247 |
| | | | 359/824 |
| 2015/0316745 A1* | 11/2015 | Chen | H02K 41/035 |
| | | | 359/824 |
| 2015/0358528 A1* | 12/2015 | Brodie | G03B 3/10 |
| | | | 348/345 |
| 2016/0044247 A1* | 2/2016 | Shabtay | H04N 5/23296 |
| | | | 348/240.3 |
| 2016/0073028 A1* | 3/2016 | Gleason | H04N 5/23287 |
| | | | 348/208.2 |
| 2017/0094182 A1* | 3/2017 | Miller | H04N 5/23296 |

OTHER PUBLICATIONS

Chung, et al., "Development of Compact Camera Module Having Auto Focus Actuator and Mechanical Shutter System for Mobile Phone", In Proceedings of International Conference on Control Automation and Systems, Oct. 17, 2007, 4 pages.

"International Search Report & Written Opinion Issued in PCT Application No. PCT/US2016/027517", dated Jun. 24, 2016, 11 Pages.

"Second Written Opinion Issued in PCT Application No. PCT/US2016/027517", dated Mar. 21, 2017, 5 Pages.

"International Preliminary Report on Patentability Issued in PCT Application No. PCT/US2016/027517", dated Jun. 12, 2017, 7 Pages.

\* cited by examiner

MULTI-LENS IMAGING APPARATUS WITH ACTUATOR

BACKGROUND

Digital cameras usually comprise a lens and a sensor for capturing an image by capturing light and converting it into electrical signals. Mobile electronic devices such as smart phones may be equipped with an imaging apparatus, a camera. Some smart phones have two cameras, one on the front side and one on the back side. The back side camera is usually regarded as the main camera and may be equipped with features such as optical image stabilization and auto-focus, whereas the front camera may lack some features to reduce the manufacturing costs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The imaging system has two lenses coupled together, wherein both lenses face different sides of the device body. Each lens has a separate image sensor; for example, the first lens is for the front side camera and the second lens is for the back side camera. A single actuator moves both lenses simultaneously. Depending on the imaging direction, either the front side image sensor or the back side image sensor is activated and the image is received through the corresponding lens system. The actuator generates autofocus or image stabilization functions for both cameras.

Many of the attendant features will be more readily appreciated as they become better understood by reference to the following detailed description considered in connection with the accompanying drawings. The embodiments described below are not limited to implementations which solve any or all of the disadvantages of known imaging apparatuses integrated in hand-held devices.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Although the present examples are described and illustrated herein as being implemented in a smartphone, the device described is provided as an example and not a limitation. As those skilled in the art will appreciate, the present examples are suitable for application in a variety of different types of mobile and/or hand-held apparatuses, e.g. in tablets, laptops or gaming consoles.

Figure 1:
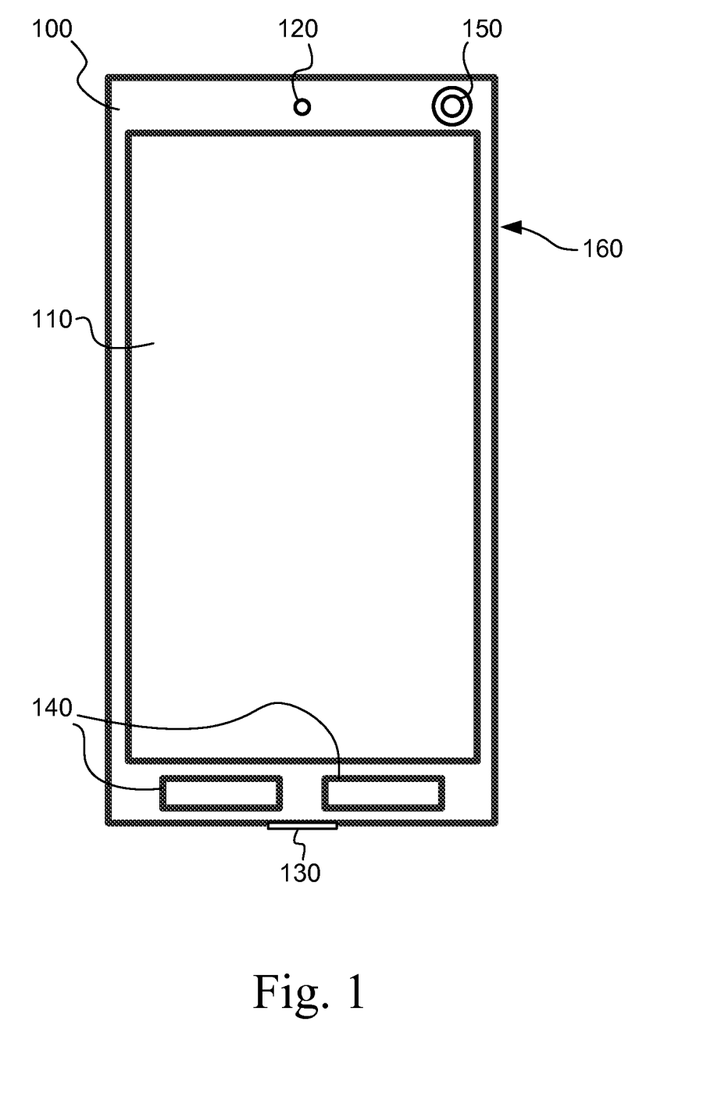
FIG. 1 is a schematic diagram of one example of an electronic device incorporating an imaging apparatus.

FIG. 1 shows one example of an electronic device incorporating an imaging apparatus, wherein one embodiment of the electronic device is a smartphone. The electronic device comprises a body 100 comprising a display 110, a speaker 120, a microphone 130 and keys 140. The display is usually on the front side of the electronic device. The electronic device comprises an imaging apparatus 150, a camera. The electronic device may comprise at least two cameras, for example one facing the front side 150 and another facing the rear side 160.

Figure 2:
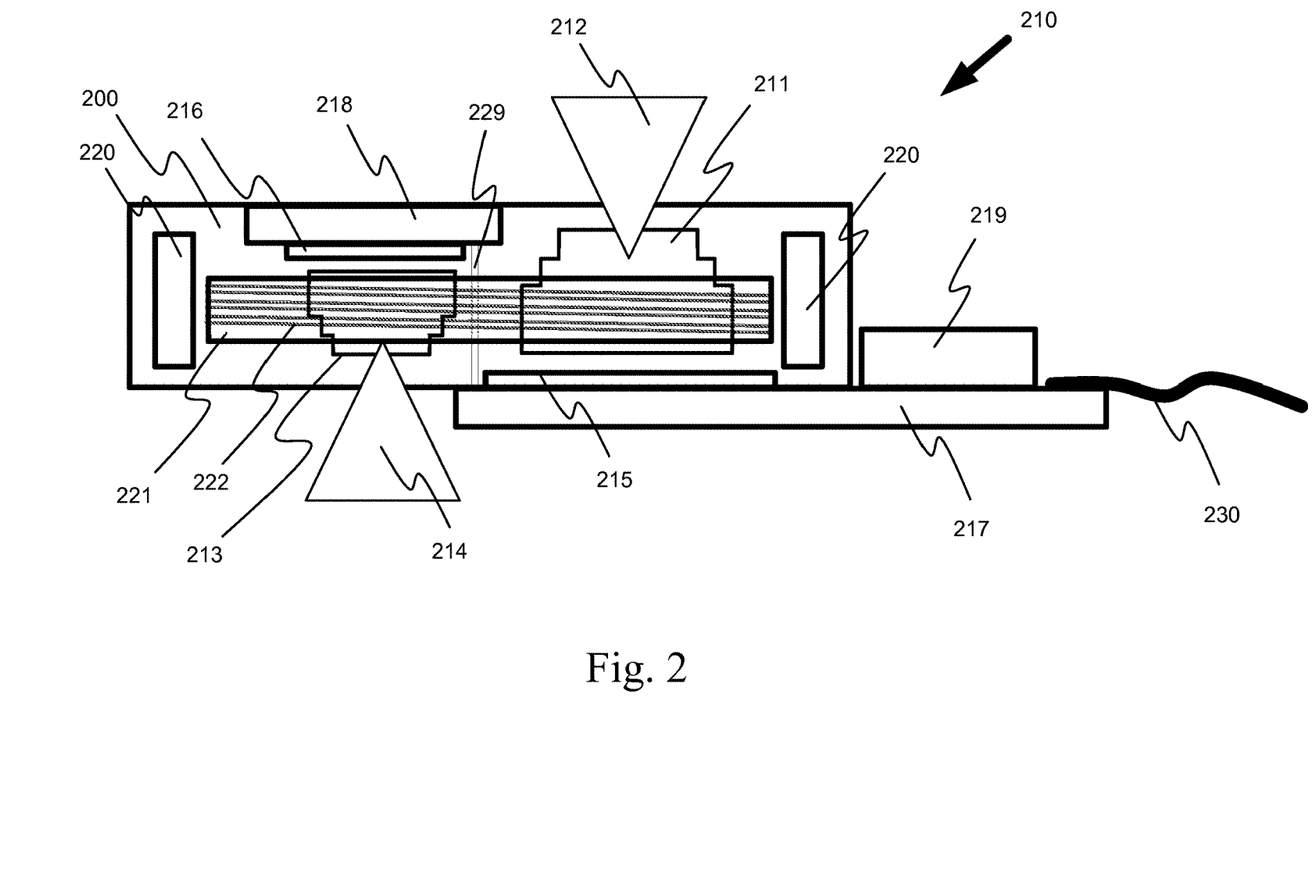
FIG. 2 is a schematic diagram of one example of an imaging apparatus having two lenses.

FIG. 2 shows one example of an imaging apparatus 210 having two lenses. The imaging apparatus 210 comprises a body 200. In one embodiment, the body is the housing around the imaging apparatus. In one embodiment, the body is the housing of the electronic device, such as a smart phone. For example, the smart phone body may be flat, with a distinctive front side and back side, but the edges of the smart phone form other sides of the body. A first lens 211 is configured to receive rays of light 212 from a first side of the body 200. A second lens 213 is configured to receive rays of light 214 from a second side of the body 200. The first lens 211 and the second lens 213 are mounted into a lens carrier 221. The first lens 211 may be a part of a first optical system having two or more lenses that may be mounted to the lens carrier 221 on the same optical axis as the first lens 211. The second lens 213 may be a part of a second optical system having two or more lenses that may be mounted to the lens carrier 221 on the same optical axis as the second lens 213. The optical axis is a line along which there is some degree of rotational symmetry in an optical system. The optical axis is an imaginary line that defines the path along which light propagates through the system. An additional lens, lenses or filters may be mounted outside the lens carrier on the optical axis, for example an infrared filter, a lens to flatten the image or to change the optical characteristics such as the focal length.

An actuator 220 is coupled to the first lens 211 and to the second lens 213. The actuator 220 is configured to move the first lens 211 and the second lens 213. The coupling may be electromagnetic; for example, the lens carrier 221 may comprise an electrical coil 222 wrapped around it, forming an electromagnetic coil 222, while the actuator 220 is a magnet. The electromagnetic coil may comprise an electrical conductor such as a wire in the shape of a coil, spiral or helix. The lens carrier 221 is moved by applying electrical current to the electromagnetic coil 222, which generates a magnetic field that interacts with the magnet 220 fixed to the body 200. The direction and force of the movement may be controlled by the polarity and amount of the electric current.

The actuator 220 may comprise a plurality of coil-magnet actuators, causing different movements and different directions for the lens carrier 221. The assembly may also be reversed, with magnets mounted on the lens carrier 221 and electromagnetic coils arranged to the body 200 in proximity to said magnets. An embodiment comprises a magnet 220, wherein the first lens 211 and the second lens 213 are connected to the magnet 220; the actuator 220 is an electromagnetic actuator coupled to the magnet 220 by an electromagnetic field. In an embodiment, the actuator 220 is a barrel actuator, wherein the lens carrier 221 comprising the lens assembly is a lens barrel.

The terms 'couple', 'coupling' or 'coupled' may refer to a connection between at least two elements, a connection or a link for example by magnetic induction, a mechanical connection that allows the actuator 220 to move the lens carrier 221 or a fixed joint between at least two elements such as the first lens 211 and the second lens 213. The electromagnetic coupling may include a mechanical connection, for example a suspending mechanism for the lens carrier 221 such as a rubber band between the lens carrier and the body of the actuator 220. In some examples the coupling may be made without a mechanical connection such that the force used to move the lenses is applied through a magnetic field that pulls the actuator 220 and the electromagnetic coil 222 together or pushes them apart depending on the direction of the magnetic fields. In one example, the implementation of the coupling includes a mechanical connection without the use of force applied through a magnetic field.

In an embodiment, the actuator 220 is configured to move in the direction of an optical axis a group of lenses comprising at least the first lens 211 and the second lens 213 to maintain an image object in focus. In an embodiment, the actuator 220 is configured to move transversely to an optical axis a group of lenses 221 comprising at least the first lens 211 and the second lens 213 in response to an optical control element 219.

The optical control element 219 comprises the hardware elements to drive the autofocus system and/or the image stabilization system; examples of such hardware elements are a CPU, a hardware driver or a gyroscope. The optical control element 219 may be configured as a separate element 219 comprising a computing based device, or at least a portion of the functions may be embedded in the actuator 220. The optical control element 219 is connected to the actuator 220, wherein an electric signal may travel between the optical control element 219 and the actuator 220. The actuator 220 causes the first lens 211 to move in response to the optical control element 219. The hardware driver of the optical control element 219 may provide electrical current to at least one electromagnetic coil 222, causing the actuator 220 to move the lens carrier 221 in the direction defined by the optical control element 219. The actuator 220 receives information from the optical control element 219 that may comprise one or more orientation sensors such as gyroscope sensors, and the information is used as an input to counter the hand shaking. A computing based image detection system comparing at least two received images may be used to detect a shaking movement in the imaging apparatus 210. An interface 230 connects the imaging apparatus 210 and the information received from the first image sensor 215 and the second image sensor 216 to the electronic device. A portion of the functionality, for example some or all of the computing functions, may be executed on the electronic device.

In an embodiment, the imaging apparatus 210 comprises a first image sensor 215 configured to receive light 212 from the direction of the first lens 211 and a second image sensor 216 configured to receive light 214 from the direction of the second lens 213. The first image sensor 215 is mounted on a first base substrate 217 and the second image sensor 216 is mounted on a second base substrate 218. An electrical connection element 229 connects the first image sensor 215 and the second image sensor 216. The first image sensor 215 is in a different position than the second image sensor 216, in this example on the opposite sides of the lens carrier 221 holding the first lens 211 and the second lens 213. The first image sensor 215 is arranged on the first optical axis for capturing the image from the first side. The second image sensor 216 is arranged on the second optical axis for capturing the image from the second side. The image sensor 215, 216 is a sensor that detects and conveys the information that constitutes an image. The image sensor 215, 216 comprises for example a plurality of light sensing elements that capture and measure the light to form an image of pixels. One example of the image sensor is a device that converts an optical image into an electronic signal.

Figure 3:
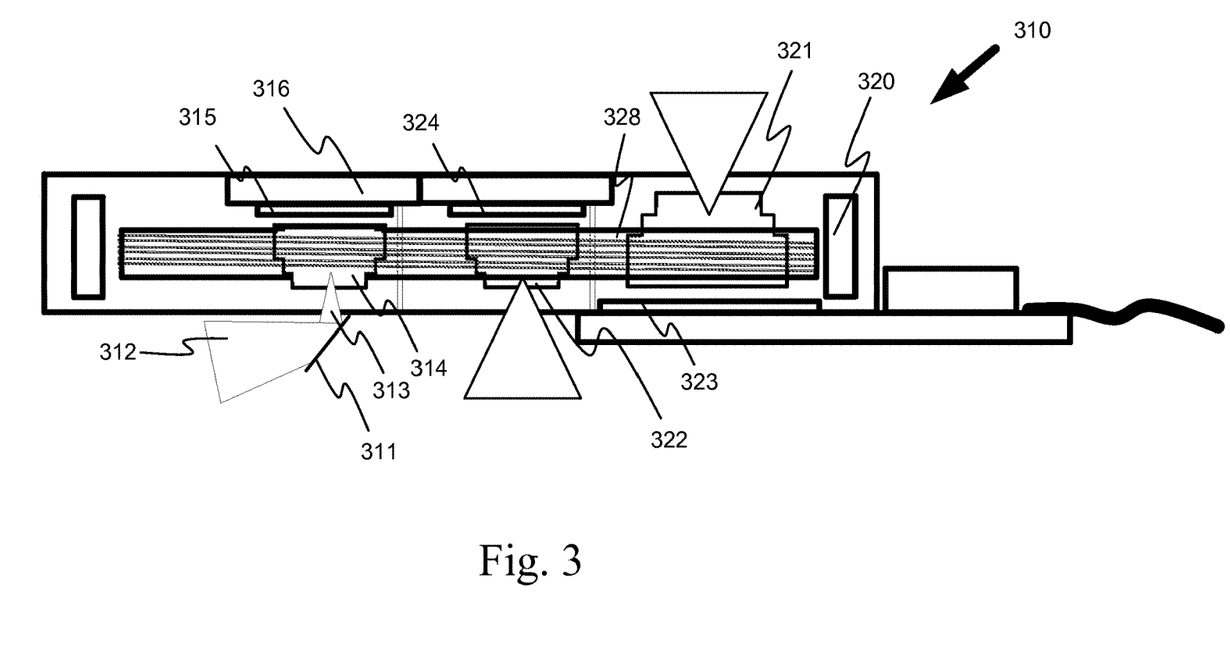
FIG. 3 is a schematic diagram of one example of an imaging apparatus having a third lens.

FIG. 3 shows one example of an imaging apparatus with a third lens. The imaging apparatus 310 comprises a third lens 314 coupled to the actuator 320. In an embodiment, the third lens 314 is configured to receive light 313 from a third side of the body. In an embodiment, the third lens 314 is coupled to the first lens 321 and to the second lens 322, wherein the actuator 320 is configured to move the third lens 314 with the first lens 321 and the second lens 322. The third lens 314 is configured to receive light from a third direction 312 and to allow light to travel to the first image sensor 323, the second image sensor 324 or a third image sensor 315. In this example, the imaging apparatus comprises the third image sensor 315 on the same plane as the second image sensor 324. The third image sensor 315 is mounted on the same substrate 316 as the second image sensor 324. The first lens 321, the second lens 322 and the third lens 314 are mounted on the same lens carrier 328 that the actuator 320 is configured to move. The lens carrier 328 couples the first lens 321, the second lens 322 and the third lens 314 together. The third lens 314 may be a part of a third optical system having two or more lenses that may be mounted to the lens carrier 328 on the same optical axis as the third lens 314.

The third lens 314 receives light from the third direction 312, as the direction of the light may be deflected by a prism or reflected by a mirror 31. The mirrored image may be reversed by the imaging apparatus 310 by turning around the information from the detected electric signals. In one embodiment, the lens carrier comprises a plurality of lenses or more than three lenses. The lenses may receive light from different directions with the help of light deflecting or light reflecting elements. The optical axis may be in a different direction than the parallel optical axes of the first lens 321 and the second lens 322. Prisms, mirrors or any other light deflecting or reflecting elements may be mounted on the lens carrier 328 or they may be mounted on the body.

Figure 4:
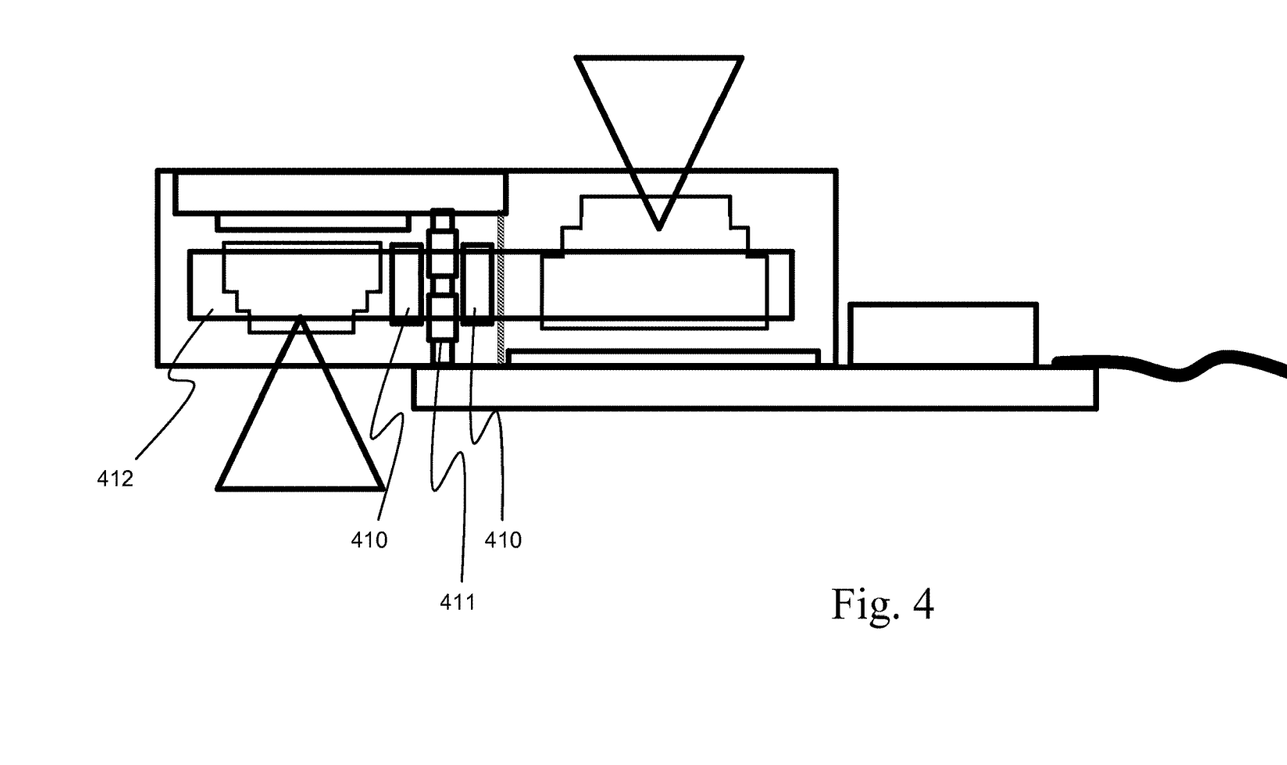
FIG. 4 is a schematic diagram of one example of an imaging apparatus having a moving magnet and a static electromagnetic coil.

The examples illustrated in FIG. 2 and FIG. 3 show a simplified structure having electromagnetic coil-magnet pairs as actuators configured to move the lens carrier on one axis. Such examples may comprise more electromagnetic coil-magnet pairs allowing more directions of movement. The positions of electromagnetic coils and magnets may vary. FIG. 4 shows an embodiment of the imaging apparatus having a moving magnet 410 and a static electromagnetic coil 411 as the electromagnetic actuator. The magnet 410 is mounted on the lens carrier 412. The static electromagnetic coil 411 is fixed to the body of the imaging apparatus and in this example mounted vertically. The apparatus may comprise multiple electromagnetic coils and magnets to achieve different movements for the lens carrier 412. The movements of the lens carrier are controlled by the electric current driven through the static electromagnetic coil 411.

Figure 5A:
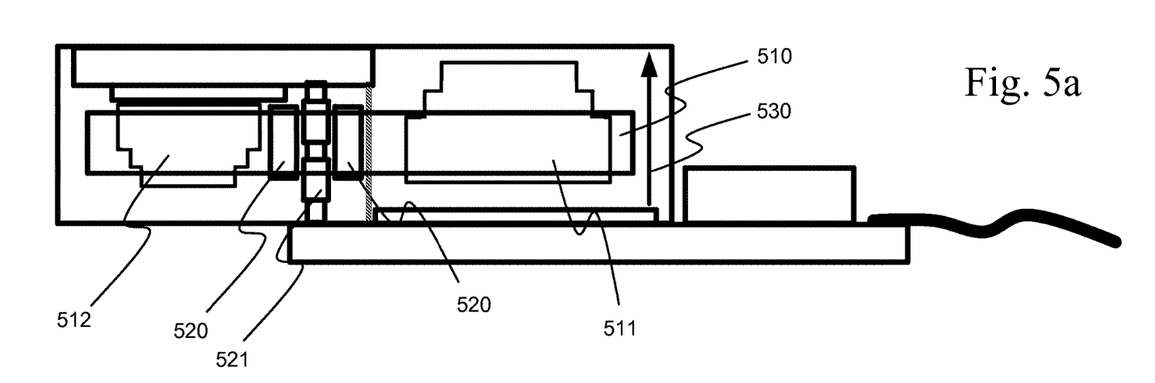
FIG. 5a illustrates an example of the autofocus feature, wherein the lenses are in a first position on the optical axis.
Figure 5B:
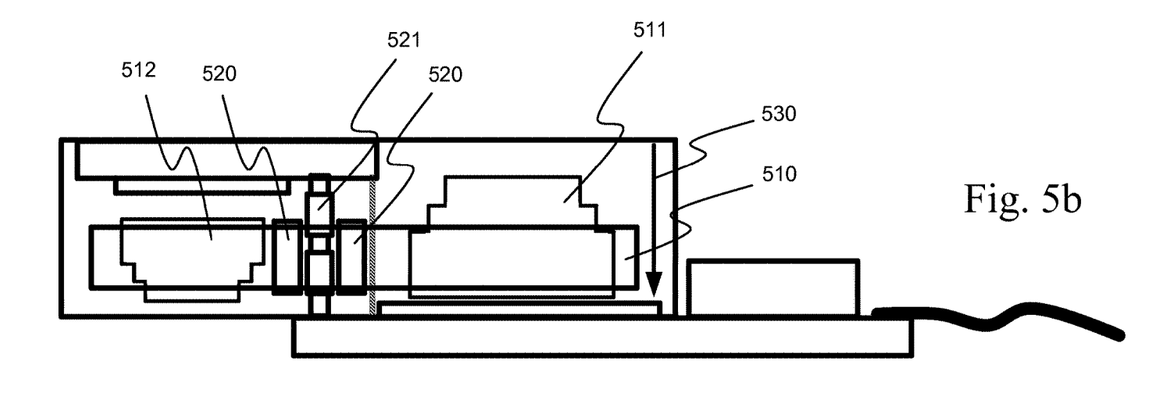
FIG. 5b illustrates an example of the autofocus feature, wherein the lenses are in a second position on the optical axis.

FIGS. 5a and 5b show an example of the autofocus feature. The lens carrier 510 carries the first lens 511 and the second lens 512. The electromagnetic actuator system comprises a magnet 520 mounted to the lens carrier 510. The coil 521 is configured to move the magnet and the lens carrier 510 with the mounted lenses. The actuator 520, 521 is configured to move in the direction 530 of the optical axis a group of lenses comprising at least the first lens 511 and the second lens 512 to maintain an image object in focus. In FIG. 5a the lens carrier 510 moves to the first direction, up according to this illustration and in FIG. 5b the lens carrier 510 moves to the second direction, down according to this illustration. The imaging apparatus may select only one image sensor to be active at a time; therefore, the imaging device focuses the image on a single image sensor. The time used for focusing the image is short compared to the human movement; therefore, the system may use different imaging sensors sequentially, wherein it appears to be simultaneous to the user of the imaging apparatus. The imaging direction may be selectable by the user, the imaging apparatus or the electronic device. At least one optical system may be selected to be hyperfocal, wherein the image is in focus after a predefined distance from the lens.

Figure 6A:
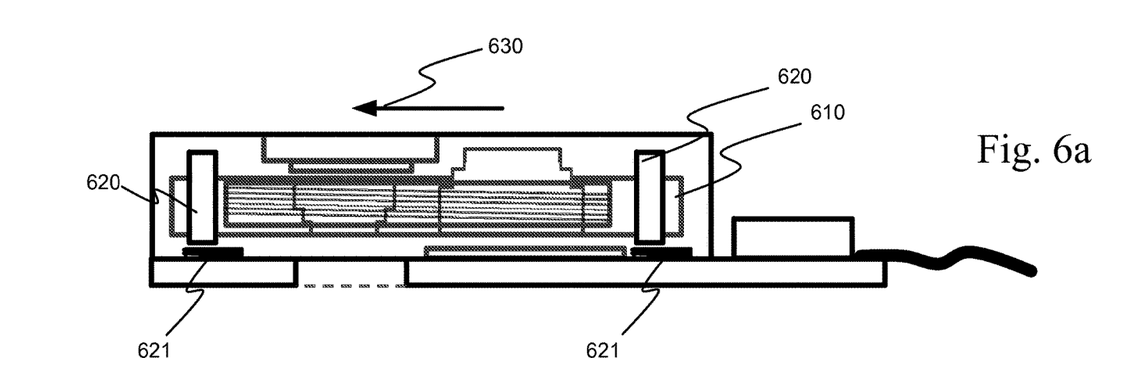
FIG. 6a illustrates an example of the optical image stabilization feature, wherein the lenses are in a first position on the optical axis.
Figure 6B:
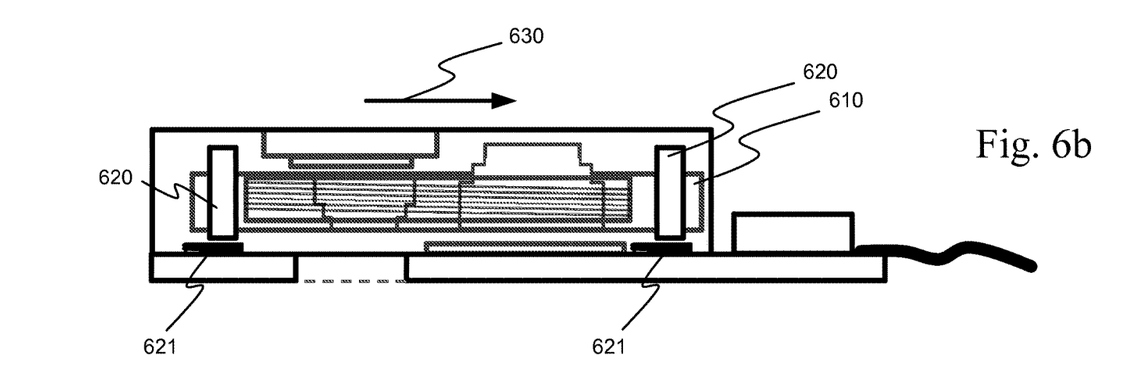
FIG. 6b illustrates an example of the optical image stabilization feature, wherein the lenses are in a second position on the optical axis.

FIGS. 6a and 6b show an example of the optical image stabilization. The lens carrier 610 carries the first lens 611 and the second lens 612. The electromagnetic actuator system comprises a magnet 620 mounted to the lens carrier 610. The coil 621 is configured to move the magnet and the lens carrier with the mounted lenses. The actuator 620, 621 is configured to move transversely 630 to the optical axis a group of lenses comprising at least the first lens 611 and the second lens 612 in response to an optical image stabilization element. In FIG. 6a the lens carrier 610 moves to the first direction, left according to this illustration and in FIG. 6b the lens carrier 610 moves to the second direction, right according to this illustration. The imaging apparatus may select only one image sensor to be active at a time; therefore, the imaging device stabilizes the image on a single image sensor. In an embodiment where the optical axes are parallel, the movement caused by the actuator 620,621 improves the stability of both cameras, allowing simultaneous imaging, for example recording videos.

The imaging apparatus, the apparatus and the system enable a more simplified and economical solution for a two-directional camera system. Applying the optical image stabilization and autofocus to the front camera and to the back side camera does not require implementing fully separate mechanical solutions for both cameras. The two-directional camera may comprise an autofocus function or optical image stabilization. The same actuator structure may be used for more than one camera. For example, the autofocus may be executed for the front side camera of the mobile phone without the additional cost of a second actuator. Similarly, the optical image stabilization may be executed for the front side camera of the mobile phone without the additional cost of a second actuator. The shared actuator structure enables a smaller multiple camera solution compared to separate cameras. The hardware design may be simplified as the autofocus and/or optical image stabilization control circuitry can be shared between several cameras. The same hardware system can be used for controlling the image sensor.

One aspect discloses an imaging apparatus comprising a body; a first lens configured to receive light from a first side of the body; a second lens configured to receive light from a second side of the body; an actuator coupled to the first lens and to the second lens, configured to move the first lens and the second lens. An embodiment comprises a first image sensor configured to receive light from the direction of the first lens and a second image sensor configured to receive light from the direction of the second lens. An embodiment comprises a third lens coupled to the actuator. In an embodiment the third lens is configured to receive light from a third side of the body. In an embodiment the actuator is configured to move in the direction of an optical axis a group of lenses comprising at least the first lens and the second lens to maintain an image object in focus. In an embodiment the actuator is configured to move transversely to an optical axis a group of lenses comprising at least the first lens and the second lens in response to an optical image stabilization element. In an embodiment the actuator is a barrel actuator. An embodiment comprises a magnet, wherein the first lens and the second lens are connected to the magnet; and the actuator is an electromagnetic actuator coupled to the magnet by an electromagnetic field. An embodiment comprises a magnet, wherein the first lens and the second lens are connected to the magnet; and the actuator comprises an electromagnetic coil coupled to the magnet by an electromagnetic field. An embodiment comprises a magnet, wherein the magnet is connected to the body; and the actuator comprises an electromagnetic coil coupled to the magnet by an electromagnetic field.

One aspect discloses an apparatus comprising a first lens configured to receive light from a first direction and to allow light to travel to a first image sensor; a second lens configured to receive light from a second direction and to allow light to travel to a second image sensor; and an actuator configured to move the first lens and the second lens, wherein the first lens and the second lens are coupled together. An embodiment comprises a third lens coupled to the first lens and to the second lens, wherein the actuator is configured to move the third lens with the first lens and the second lens and the third lens is configured to receive light from a third direction and to allow light to travel to the first image sensor, the second image sensor or a third image sensor. In an embodiment the actuator is configured to move in the direction of the optical axis a group of lenses comprising at least the first lens and the second lens to maintain an image object in focus. In an embodiment the actuator is configured to move transversely to the optical axis a group of lenses comprising at least the first lens and the second lens in response to an optical image stabilization element. In an embodiment the actuator is a barrel actuator. An embodiment comprises a group of lenses comprising at least the first lens and the second lens; a magnet, coupled to the group of lenses, and the actuator is an electromagnetic actuator configured to move the magnet. An embodiment comprises a group of lenses comprising at least the first lens and the second lens; wherein the actuator is an electromagnetic actuator configured to move the group of lenses.

One aspect discloses a system comprising a body; a first lens configured to receive light from a first side of the body; a second lens configured to receive light from a second side of the body; and an actuator configured to move the first lens and the second lens. An embodiment comprises a first image sensor configured to receive light from the direction of the first lens and a second image sensor configured to receive light from the direction of the second lens. An embodiment comprises a third lens coupled to the actuator, wherein the third lens is configured to receive light from a third side of the body and the actuator is configured to move the third lens with the first lens and the second lens. In an embodiment the actuator is configured to move in the direction of the optical axis at least the first lens and the second lens to maintain an image object in focus. In an embodiment the actuator is configured to move transversely to the optical axis at least the first lens and the second lens in response to an optical image stabilization element. An embodiment comprises a group of lenses comprising at least the first lens and the second lens; a magnet, coupled to the group of lenses, and the actuator is an electromagnetic actuator configured to move the magnet. An embodiment comprises a group of lenses comprising at least the first lens and the second lens; wherein the actuator is an electromagnetic actuator configured to move the group of lenses.

Alternatively, or in addition, the functionality described herein can be performed, at least in part, by one or more hardware components or hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs). For example, some or all of the optical image stabilization element functionality or autofocus element functionality may be performed by one or more hardware logic components.

An example of the apparatus or a system described hereinbefore is a computing-based device comprising one or more processors which may be microprocessors, controllers or any other suitable type of processors for processing computer executable instructions to control the operation of the device in order to control one or more sensors, receive sensor data and use the sensor data. Platform software comprising an operating system or any other suitable platform software may be provided at the computing-based device to enable application software to be executed on the device.

The computer executable instructions may be provided using any computer-readable media that is accessible by computing based device. Computer-readable media may include, for example, computer storage media such as memory and communications media. Computer storage media, such as memory, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media is shown within the computing-based device it will be appreciated that the storage may be distributed or located remotely and accessed via a network or other communication link, for example by using communication interface.

The computing-based device may comprise an input/output controller arranged to output display information to a display device which may be separate from or integral to the computing-based device. The display information may provide a graphical user interface, for example, to display hand gestures tracked by the device using the sensor input or for other display purposes. The input/output controller is also arranged to receive and process input from one or more devices, such as a user input device (e.g. a mouse, keyboard, camera, microphone or other sensor). In some examples the user input device may detect voice input, user gestures or other user actions and may provide a natural user interface (NUI). This user input may be used to configure the device for a particular user such as by receiving information about bone lengths of the user. In an embodiment the display device may also act as the user input device if it is a touch sensitive display device. The input/output controller may also output data to devices other than the display device, e.g. a locally connected printing device.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not only include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Any range or device value given herein may be extended or altered without losing the effect sought.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An imaging apparatus comprising:
a body having a first side facing a first direction and a second side facing an opposite direction of the first direction;
a lens carrier;
a first lens mounted to the lens carrier and configured to receive light from the first side of the body from the first direction;
a second lens mounted to the lens carrier and configured to receive light from the second side of the body from the opposite direction of the first direction;
magnets mounted to the lens carrier in between the first lens and the second lens;
an electromagnetic coil mounted to the body and positioned in between the first lens and the second lens and
an optical control element configured to move the first lens in the first direction and the second lens in the opposite direction through supplying the electromagnetic coil with current to create electromagnetic forces with the magnets.

2. An imaging apparatus according to claim 1, further comprising a first image sensor configured to receive light from the direction of the first lens and a second image sensor configured to receive light from the direction of the second lens.

3. An imaging apparatus according to claim 1, wherein the imaging apparatus comprises a smartphone.

4. An imaging apparatus according to claim 1, wherein a direction of movement for the first lens is dictated by the polarity of the current supplied by the optical control element.

5. An imaging apparatus according to claim 1, wherein the electromagnetic coil receiving the current causes an actuator to move in response to an optical image stabilization element.

6. An imaging apparatus according to claim 1, further comprising a barrel actuator.

7. An imaging apparatus according to claim 1, wherein the the optical control element comprises a hardware driver for supplying the current.

8. An imaging apparatus according to claim 1, wherein the electromagnetic coil is positioned between two of the magnets.

9. An apparatus comprising a body having a first side and a second side and a lens carrier, the apparatus comprising:
a first lens mounted to the lens carrier, facing a first direction, and configured to receive light from a first optical axis to allow light to travel to a first image sensor;
a second lens mounted to the carrier, facing an opposite direction of the first direction, and configured to receive light from a second optical axis to travel to a second image sensor;
magnets mounted to the lens carrier in between the first lens and the second lens;
an electromagnetic coil mounted to the body and positioned in between the magnets; and
an optical control element configured to move the first lens in the first direction and the second lens in the opposite direction through supplying the electromagnetic coil with current to create electromagnetic forces with the magnets.

10. An apparatus according to claim 9, wherein the optical control element comprises a hardware driver for supplying the current.

11. An apparatus according to claim 9, wherein the magnets comprise two magnets.

12. An apparatus according to claim 9, wherein different polarity of the current causes the electromagnet coil to move the first lens in the opposite direction.

13. An apparatus according to claim 9, wherein the apparatus comprises a smartphone.

14. An apparatus according to claim 9, comprising:
a group of lenses comprising at least the first lens and the second lens;
wherein the magnets are configured to move the group of lenses.

15. A system comprising:
a body having a first side and a second side;
a lens carrier;
a first lens mounted to the lens carrier, facing a first direction, and configured to receive light from a first side of the body;

a second lens mounted in the lens carrier, facing an opposite direction of the first direction, and configured to receive light from a second side of the body;

magnets mounted to the lens carrier in between the first lens and the second lens;

an electromagnetic coil mounted to the body between the first lens and the second lens; and an optical control element configured to move the first lens in the first direction and the second lens in the opposite direction through supplying the electromagnetic coil with current to create electromagnetic forces with the magnets.

16. A system according to claim 15, comprising a first image sensor configured to receive light from the first direction of the first lens and a second image sensor configured to receive light from the opposite direction of the second lens.

17. A system according to claim 15, further comprising a barrel actuator.

18. A system according to claim 15, wherein the optical control element is configured to supply the current for moving the first lens in the first direction to maintain an image object in focus.

19. A system according to claim 15, wherein the magnets comprises two magnets.

20. A system according to claim 15, comprising:

a group of lenses comprising at least the first lens and the second lens;

wherein the optical control element comprises a hardware driver for supplying the current.

* * * * *